United States Patent Office 2,809,185
Patented Oct. 8, 1957

2,809,185
POLYMERIZATION OF UNSATURATED ALDEHYDES WITH NITRITE CATALYSTS

George W. Hearne, Lafayette, Donald S. La France, Concord, and Edward C. Shokal, Walnut Creek, Calif., assignors to Shell Development Company, New York, N. Y., a corporation of Delaware No Drawing. Application October 25, 1954,
Serial No. 464,618

10 Claims. (Cl. 260—67)

This invention relates to polymers of unsaturated aldehydes. More particularly, the invention relates to polymers of ethylenically unsaturated aldehydes, to a method for their preparation, and to the utilization of the polymers in the preparation of polymeric polyhydric alcohols.

Specifically, the invention provides polymers of alpha,-beta-ethylenically unsaturated aldehydes, such as acrolein, which may be easily converted to soluble polymeric polyhydric alcohols, and a method for preparing the polymeric aldehydes which comprises contacting the monomeric alpha,beta-ethylenically unsaturated aldehydes with a catalytic amount of a member of the group of alkali and alkaline earth nitrites, preferably in the presence of a solvent or diluent containing at least one OH group.

The invention further provides soluble polymeric polyhydric alcohols obtained from the above-described polymeric aldehydes by contacting the said polymers with hydrogen at an elevated temperature and pressure in the presence of a hydrogenation catalyst.

It is known that unsaturated aldehydes, such as acrolein, may be polymerized by the addition of bases, such as sodium hydroxide and sodium carbonate. Little use for these polymers as such has been found, however, and considerable effort has been put forth to try and convert the polymers to more useful products. Attempts have been made, for example, to hydrogenate the polymers to form polymeric polyhydric alcohols. These attempts have not been successful, however, because the aldehyde polymers produced by these methods have been resistant to hydrogenation and/or have been depolymerized in the presence of the hydrogen. Some polymeric polyhydric alcohols have been prepared from the unsaturated aldehydes (Evans—U. S. 2,478,154), but in this case it was first necessary to form a polymer of an ester derivative of the aldehyde, subject the polymer to hydrolysis and then hydrogenate the resulting polymeric aldehyde. This indirect method is obviously not economically attractive.

It is an object of the invention to provide polymers of unsaturated aldehydes. It is a further object to provide polymers of unsaturated aldehydes which may be easily hydrogenated to form valuable polymeric polyhydric alcohols. It is a further object to provide a new method for polymerizing alpha,beta-ethylenically unsaturated aldehydes. It is a further object to provide a new method for polymerizing alpha,beta-ethylenically unsaturated aldehydes which may be accomplished in a very short period of time. It is a further object to provide a new method for preparing polymeric polyhydric alcohols from unsaturated aldehydes. These and other objects of the invention will be apparent from the following detailed description thereof.

It has now been found that these objects may be accomplished in part by the polymeric aldehydes of the present invention which are formed by contacting monomeric alpha,beta-ethylenically unsaturated aldehydes with a catalytic amount of a member of the group of alkali and alkaline earth nitrites, preferably in the presence of a solvent or diluent containing at least one OH group. When the unsaturated aldehydes are contacted with these special catalytic materials, they rapidly polymerize to form solid polymeric products which are surprisingly easy to hydrogenate to form polymeric polyhydric alcohols. Polyacrolein formed by the above method can, for example, be easily hydrogenated to form polyallyl alcohol in good yields.

The unsaturated aldehydes that may be polymerized according to the process of the invention comprise the alpha,beta-ethylenically unsaturated aldehydes, i. e., aldehydes having an ethylenic group between two carbon atoms one of which is attached to an aldehyde

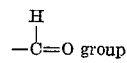

group

The aldehydes may be straight chain or cyclic in character and may or may not contain one or more aromatic constituents. The most desirable aldehydes for the purpose of the present invention have a terminal methylene group attached directly by a double bond to a carbon atom which in turn is attached directly to an aldehyde group, as represented by the general formula

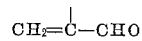

In general, aldehydes useful in the process of the invention have not more than about 10 carbon atoms in the molecule. Examples of suitable alpha,beta-unsaturated aldehydes having a terminal methylene group are acrolein, alpha-methyl acrolein, alpha-ethyl acrolein, alpha-propyl acrolein, alpha-isobutyl acrolein, alpha-n-amyl acrolein, alpha-n-hexyl acrolein, alpha-bromo acrolein, etc. Examples of other alpha,beta unsaturated aldehydes that may be used include, among others, crotonaldehyde, alpha-chlorocrotonaldehyde, beta-chlorocrotonaldehyde, alpha-bromo-crotonaldehyde, beta-bromo-crotonaldehyde, alpha,gamma-dichlorocrotonaldehyde, alpha,beta-dimethyl acrolein, alpha-methyl-beta-ethylacrolein, alpha-methyl-beta-isopropyl acrolein, alpha-ethyl-beta-propyl acrolein, and the like. Particularly preferred are the 2-alkenals containing no more than 8 carbon atoms.

The special catalytic materials used in the polymerization of the above-described aldehydes comprise the alkali and alkaline earth nitries, alkali metals being the monovalent metals of group I of the periodic system as lithium, sodium, potassium, rubidium, and cesium and the alkaline earth metals being the reactive polyvalent metals of group II of the periodic system, such as, for example, beryllium, magnesium, calcium, zinc, strontium, cadmium and barium. These compounds may be exemplified by sodium nitrite, potassium nitrite, cesium nitrite, magnesium nitrite, cadmium nitrite, calcium nitrite, barium nitrite, strontium nitrite, zinc nitrite, and beryllium nitrite. Particularly preferred are the alkali nitrites and especially sodium and potassium nitrite.

The amount of catalyst employed in the polymerization of the unsaturated nitrites may vary over a considerable range. The amount may range from as low as 0.01% to as high as 10% or more of the total weight of the monomer being polymerized. In most cases, however, amounts of catalyst varying from .1% to 5% by weight of monomer are sufficient to effect a rapid reaction and this is the preferred range to be employed.

The polymerization may be carried out at temperatures ranging from about —50° C. to 250° C. Temperatures below about 0° C. are seldom employed however, and the reaction is preferably conducted at temperatures ranging from 0° C. to 100° C. In many cases there may be a slight induction period in which no activity is shown and then the reaction may take place very rapidly. In this case, it may be desirable to employ relatively high temperatures at the beginning to lessen the induction period, and then remove the heat after the reaction has commenced.

The polymerization may be effected in bulk, solvent or aqueous emulsion or suspension systems. For most practical purposes it is preferred to conduct the polymerization in bulk or in a solvent, such as for example, benzene, toluene, ethanol, methanol, dioxane, acetonitrile, isopropyl ether, acetone-water mixtures, and the like. The polymerization is preferably accomplished in presence of solvents or diluents containing at least one OH group, such as, for example, ethanol, propanol, ethylene glycol, diethylene glycol, methanol, isopropanol, butanol and the like. Polymers formed in the presence of these materials are particularly easy to hydrogenate. When polymerization is conducted in a solvent, the concentration of monomer may be varied over a wide range but is preferably maintained between about 1% to 40% by weight of the solvent employed.

After the polymerization has been accomplished, the polymeric aldehydes may be recovered from the reaction mixture by any suitable means, such as filtration, extraction and the like, and the nitrite catalyst removed from the polymer by washing with water or other suitable solvent.

The process of the invention may be used for the homopolymerization or copolymerization of any of the above-described unsaturated aldehydes as well as for the copolymerization of the unsaturated aldehydes with other types of monomers containing an ethylenic double bond which are copolymerizable with the unsaturated aldehydes. Preferred members of this group of monomers include those having a single $CH_2=C=$ group, such as for example, styrene, alpha-methyl styrene, vinyl chloride, vinylidene chloride, methyl methacrylate, ethyl acrylate, acrylonitrile, methacrylonitrile, allyl acetate, vinyl acetate, chloroallyl caproate, allyl alcohol, isobutylene, allyl glycidyl ether, vinyl methyl ether, allyl glycolate, methyl allyloxyacetate, allyloxyacetic acid, vinylpyridine, glycidyl methacrylate, hydroxyethyl methacrylate, octyl acrylate, vinyl pyrollidone, allyl dimethyl cyanurate, allyl butyl phthalate, dialkyl maleates, and the like. In preparing copolymers of the unsaturated aldehydes with the dissimilar monomer, it is preferred to employ the dissimilar monomer in amounts varying from .1% to 45% by weight of the total monomer mixture.

The polymers of the unsaturated aldehydes produced as shown above are high molecular weight solids which may be used for a variety of applications. They may be reacted, for example, with urea and thiourea to form resins useful in the formation of film forming materials, or they may be employed as cross-linking agents or modifiers for various resinous compositions.

They are particularly useful, however, in the preparation of polymeric polyhydric alcohols. Unlike the other polymeric aldehydes formed by the known polymerization methods, they readily react with hydrogen to form high molecular weight polymers having a plurality of hydroxyl groups. The hydrogenation of the polymeric aldehydes is preferably accomplished by merely treating the polymers with hydrogen at a temperature between 130° C. and 300° C. and superatmospheric pressure in the presence of a hydrogenation catalyst.

The hydrogenation may be accomplished in the presence or absence of added diluents or solvent. In some cases it may be desirable to employ solvents, which are relatively inert to the hydrogenation reaction, such as ethanol, isopropanol, ethylene glycol, dioxane, and the like, and mixtures thereof, to facilitate operation of the process.

Catalysts that are used in the hydrogenation are preferably the metals of groups I, II and IV to VIII of the periodic table of elements, their alloys and derivatives such as their sulfides, oxides and chromites. Examples of such catalysts include silver, copper, iron, manganese, molybdenum, nickel, palladium, platinum, chromium, cobalt, rhodium, tungsten, mixtures of the metals, such as copper-silver mixtures, copper-chromium mixtures, nickel-cobalt mixtures, and their derivatives such as copper oxide, copper chromite, nickel sulfide, silver sulfide, and the like. Particularly preferred catalysts are the members of the group consisting of nickel, copper, cobalt, iron, chromium, silver and platinum, and their oxides, sulfides and chromites. These catalysts may be employed in a finely-divided form and dispersed in and throughout the reaction mixture, or they may be employed in a more massive state, either in essentially the pure state or supported upon or carried by an inert carrier material, such as pumice, kieselguhr, diatomaceous earth, clay, alumina, charcoal, carbon or the like, and the reaction mixture contacted therewith as by flowing the mixture over or through a bed of the catalyst or according to other methods known in the art.

The amount of the catalyst employed may vary over a considerable range depending upon the type of catalyst employed, the specific polymer, etc. In general, the amount of the catalyst will vary from 1% to 30% by weight of the reactants. Preferred amounts of catalyst range from 1% to 25% by weight. The above-noted preferred catalysts are generally employed in amounts varying from 1% to 20% by weight.

Temperatures used during the hydrogenation will be at least above 50° C. and not in excess of 300° C. Particularly preferred temperatures range from 100° C. to 250° C. Hydrogen pressure of 250 pounds per square inch are effective, but higher pressures of the order of about 500 to 3000 p. s. i. are generally more preferred. Particularly preferred hydrogen pressures range from about 1000 p. s. i. to 3000 p. s. i.

The hydrogenation may be executed in any suitable manner and in any suitable apparatus of the type that is customarily employed for hydrogenation processes. A method of carrying out the process that has been found to be advantageous comprises placing the polymer, solvent and catalyst in a pressure-resistant vessel equipped with the necessary inlets and outlets, heating means, pressure gauge, thermometer, etc., and desirably with means for agitating the contents, and subjecting the resulting mixture to the action of hydrogen gas under the aforedescribed conditions of temperature and pressure in the presence of the catalyst until absorption of hydrogen is for practical purposes complete.

At the completion of the hydrogenation, the polymeric alcohol may be recovered from the reaction mixture by any suitable manner. For example, the hydrogenation catalyst, if dispersed in the reaction mixture, may be removed by filtration, centrifugation, etc. The desired polymeric alcohol may be recovered and purified by any suitable means, such as vacuum distillation, solvent extraction, and the like.

The polymeric polyhydric alcohols produced by the hydrogenation of the polymeric aldehydes are useful for a great many important applications. They are useful, for example, as sizing materials for textiles, as greaseproof impregnating agents for paper and the like. They are also useful as chemical intermediates in the preparation of other valuable materials. They may be reacted with aldehydes, for example, to form resinous acetals, with nitric acid to form nitrate explosives, and with unsaturated acids to form drying oils.

The polymeric polyhydric alcohols are particularly useful as chemical intermediates in the formation of polyesters for use as plasticizers and as components for surface coating compositions. To prepare these derivatives, one heats the polymeric polyhydric alcohol with a polybasic acid or anhydride alone or with modifying agents, such as non-drying or drying oil fatty acids, preferably in an inert atmosphere. The polyesters prepared in this manner with the non-drying and drying and fatty acids are particularly useful as additives for baking enamels containing urea and melamine-formaldehyde resins.

To illustrate the manner in which the invention may be carried out, the following examples are given. It is to be understood, however, that the examples are for the purpose of illustration and the invention is not to be regarded as limited to any of the specific materials or conditions recited therein. Unless otherwise specified, parts disclosed in the examples are parts by weight.

*Example I*

(A) A reaction vessel equipped with thermometer and stirrer is charged with 100 parts of acrolein and 1 part of sodium nitrite. The reaction mixture is heated to 40° C. for 40 minutes. At that time reaction takes place and in about 3 hours the acrolein has polymerized to form a light yellow transparent solid.

The resulting polymer is then mixed with ethanol and treated with hydrogen at 100° C. and 2000 p. s. i. pressure in the presence of Raney nickel. In about 3 hours, all of the solid polymer had been converted to a product which dissolved in the ethanol. The mixture was removed from the hydrogenation vessel, filtered and topped at 150° C. 1 mm. to give a viscous semi-solid resin having an OH value 0.7 eq./100 g. and a carbonyl value of 0.019 eq./100 g.

The polyhydric alcohol produced above is then reacted with an equivalent amount of phthalic anhydride and 50% by weight of cocoanut fatty acids to form an alkyd resin which can be combined with urea-formaldehyde resins to form improved baking enamel.

(B) The ability of the polymer of acrolein produced above to be hydrogenated to form the polyhydric alcohol is surprising in view of the fact that other polymers prepared in the presence of acids and alkali cannot be so hydrogenated. The inability of such polymers to be hydrogenated is illustrated by the following experiment showing the results obtained with a polymer formed in the presence of NaOH.

About 100 parts of acrolein was placed in a reaction vessel as shown in A above and 10% sodium hydroxide slowly added. A vigorous reaction takes place and the mixture begins to boil. In a few minutes, the acrolein has been polymerized to form a hard crusty solid.

The polymer produced above is then mixed with ethanol and treated with hydrogen at 100° C. and 2000 p. s. i. pressure in the presence of Raney nickel. After 30 hours, the polymer still remained as the insoluble polymeric aldehyde.

*Example II*

The reaction vessel described in Example I is charged with 100 parts of acrolein and 1 part of potassium nitrite. The reaction mixture is heated to 40° C. and after about 45 minutes the acrolein begins to polymerize to form a light yellow transparent solid.

The resulting polymer is then mixed with ethanol and treated with hydrogen at 100° C. and 200 p. s. i. pressure in the presence of Raney nickel. At the end of the reaction, the mixture is filtered and the ethanol toped at 150° C. 1 mm. to give a viscous semi-solid polyhydric alcohol having an OH value of about 0.75 eq./100 g.

The polyhydric alcohol produced above is then reacted with phthalic anhydride and cocoanut fatty acids as shown in Example I to produce an alkyd useful in the preparation of baking enamels.

*Example III*

The reaction vessel described in Example I was charged with 100 parts of acrolein, 5 parts of ethyl alcohol and 1 part of sodium nitrite. On warming gently, the mixture sets up in about 10 minutes to a hard polymer.

The resulting polymer is then mixed with ethanol and treated with hydrogen at 100° C. and 2000 p. s. i. pressure in the presence of Raney nickel. At the end of the reaction, the mixture is filtered and the ethanol topped at 150° C. 1 mm. to give a viscous semi-solid polyhydric alcohol.

*Example IV*

The reaction vessel described in Example I was charged with 100 parts of acrolein, 30 parts of ethyl alcohol and 1 part of sodium nitrite. On warming gently, the mixture slowly sets up to form a soft solid polymer. Hydrogenation of this polymer as in the preceding example gave a viscous semi-solid polyhydric alcohol.

*Example V*

The reaction vessel described in Example I was charged with 100 parts of acrolein, 5 parts of allyl alcohol and 1 part of sodium nitrite. On warming gently, the mixture slowly sets up to form a soft solid polymer. Hydrogenation of this polymer as in the preceding example gave a viscous semi-solid polyhydric alcohol.

*Example VI*

The reaction vessel described in Example I was charged with 100 parts of acrolein, 10 parts of acetaldehyde and 1 part of sodium nitrite. On warming gently, the mixture slowly sets up to form a flexible solid polymer. Hydrogenation of this polymer as in the preceding example gave a viscous semi-solid polyhydric alcohol.

*Example VII*

The reaction vessel described in Example I was charged with 100 parts of acrolein and 1 part of cesium nitrite. The reaction mixture was heated to 40° C. and the acrolein polymerized very rapidly to form a hard clear solid.

The resulting polymer is then mixed with ethanol and treated with hydrogen at 100° C. and 2000 p. s. i. pressure in the presence of Raney nickel. At the end of the reaction, the mixture is filtered and the ethanol removed under vacuum. The resulting product is a viscous semi-solid having a high hydroxyl value.

This polyhydric alcohol could also be used in producing alkyd resins as shown in Examples I and II.

Related polymers that can be hydrogenated are obtained by replacing the cesium nitrite with the same amount of each of the following catalysts: beryllium nitrite, barium nitrite and strontium nitrite.

*Example VIII*

The reaction vessel described in Example I is charged with 100 parts of methacrolein and 1 part of sodium nitrite. The reaction mixture is heated to 40° C. and after a short period, the methacrolein begins to polymerize to form a light yellow transparent solid.

The resulting polymer is then mixed with ethanol and treated with hydrogen as shown in the preceding example. The resulting mixture is filtered and the ethanol topped at 150° C. 11 mm. to give a solid polyhydric alcohol.

The polyhydric alcohol produced above is then reacted with phthalic anhydride and cocoanut fatty acids as shown in Example I to produce an alkyd useful in the preparation of baking enamels.

*Example IX*

The reaction vessel described in Example I is charged with 100 parts of acrolein and 1 part of magnesium nitrite. The reaction mixture is heated to 40° C. and after a short period, the acrolein begins to polymerize to form a white transparent solid.

The resulting polymer is then mixed with ethanol and treated with hydrogen at 100° C. and 2000 p. s. i. pressure in the presence of Raney nickel. At the end of the reaction, the mixture is filtered and the ethanol topped at 150° C. 1 mm. to give a semi-solid polyhydric alcohol.

The polyhydric alcohol produced above could also be used in producing alkyd resins as shown in Examples I and II.

We claim as our invention:

1. A process for polymerizing alpha-beta-ethylenically unsaturated aldehydes to form polymers which may be hydrogenated to form polymeric polyhydric alcohols which comprises contacting at a temperature between 0° C. and 100° C. a monomer composition containing an alpha,beta-ethylenically unsaturated aldehyde with a catalytic amount of a catalyst of the group consisting of alkali and alkaline earth nitrites.

2. A process as in claim 1 wherein the unsaturated aldehyde is acrolein.

3. A process as in claim 1 wherein the catalyst is sodium nitrite.

4. A process as in claim 1 wherein the catalyst is potassium nitrite.

5. A process as in claim 1 wherein the catalyst is cesium nitrite.

6. A process as in claim 1 wherein the catalyst is magnesium nitrite.

7. A process for polymerizing alpha-beta-ethylenically unsaturated aldehydes containing no more than 10 carbon atoms to form polymers which may be hydrogenated to form polymeric polyhydric alcohols which comprises contacting at a temperature betwen 0° C. and 100° C. a monomer composition containing the alpha-beta-ethylenically unsaturated aldehyde with from 0.1% to 10% by weight of total monomer of an alkali nitrite.

8. A process for polymerizing a 2-alkenal containing no more than 8 carbon atoms which comprises contacting a monomer composition containing the 2-alkenal with from 0.1% to 10% by weight of the total monomer of sodium nitrite at a temperature between 0° C. and 100° C.

9. A process as in claim 8 wherein the aldehyde is methacrolein.

10. A process as in claim 8 wherein the aldehyde is acrolein.

References Cited in the file of this patent
UNITED STATES PATENTS

| | | |
|---|---|---|
| 2,162,616 | Herrmann et al. | June 13, 1939 |
| 2,478,154 | Evans | Aug. 2, 1949 |
| 2,554,973 | Ballard et al. | May 29, 1951 |
| 2,657,192 | Miller et al. | Oct. 27, 1953 |